(12) United States Patent
Sun et al.

(10) Patent No.: US 12,003,114 B2
(45) Date of Patent: Jun. 4, 2024

(54) SERIES/SERIES RESONANT TOPOLOGY FOR WIRELESS POWER TRANSFER

(71) Applicant: VIRGINIA TECH INTELLECTUAL PROPERTIES, INC., Blacksburg, VA (US)

(72) Inventors: Keyao Sun, Blacksburg, VA (US); Jun Wang, Blacksburg, VA (US); Rolando Burgos, Blacksburg, VA (US); Dushan Boroyevich, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 16/913,066

(22) Filed: Jun. 26, 2020

(65) Prior Publication Data
US 2021/0408923 A1    Dec. 30, 2021

(51) Int. Cl.
*H02J 50/12*       (2016.01)
*H02M 7/5387*   (2007.01)

(52) U.S. Cl.
CPC ........... *H02J 50/12* (2016.02); *H02M 7/5387* (2013.01)

(58) Field of Classification Search
CPC ...................................................... H02J 50/12
See application file for complete search history.

(56) References Cited

U.S. PATENT DOCUMENTS

| | | | | |
|---|---|---|---|---|
| 10,063,104 | B2 * | 8/2018 | Kurs ................... | H03K 5/1536 |
| 10,144,301 | B2 * | 12/2018 | Nguyen ............... | B60L 53/122 |
| 2011/0080056 | A1 * | 4/2011 | Low ...................... | H02J 7/0047 307/104 |
| 2015/0001958 | A1 * | 1/2015 | Abe ...................... | B60L 15/007 307/104 |
| 2017/0085096 | A1 * | 3/2017 | Hong ..................... | H02J 50/12 |
| 2020/0136521 | A1 * | 4/2020 | Lin ....................... | H02M 3/33569 |

FOREIGN PATENT DOCUMENTS

JP      2004254436 A   *   9/2004

OTHER PUBLICATIONS

Machine translation of JP 2004254436. Originally by Ueno, 2004, JPO.. (Year: 2004).*

(Continued)

*Primary Examiner* — Peter M Novak
(74) *Attorney, Agent, or Firm* — Thomas | Horstemeyer, LLP

(57) ABSTRACT

Aspects of an efficient compensation network for reducing reactive power in a wireless power transfer (WPT) system are disclosed. The compensation network comprises a series/series (S/S) constant current (CC) source, a reactive power compensation capacitor, and a constant current (CC)-to-constant voltage (CV) network. In an example, the S/S CC source comprises a first capacitor connected in series with a first inductor on a primary side of a transformer and a second inductor on a secondary side of the transformer. The S/S CC source converts an input voltage signal of the WPT system into a constant alternating current (AC) current signal. In an example, the CC-to-CV network comprises at least a third capacitor and a third inductor. The CC-to-CV network converts the constant AC current signal into a constant AC voltage signal.

20 Claims, 4 Drawing Sheets

(56) References Cited

OTHER PUBLICATIONS

Wang, Chwei-Sen; et al. "Power transfer capability and bifurcation phenomena of loosely coupled inductive power transfer systems." IEEE transactions on industrial electronics 51.1 (2004): 148-157.

Zhang, Wei, et al. "Analysis and comparison of secondary series- and parallel-compensated inductive power transfer systems operating for optimal efficiency and load-independent voltage-transfer ratio." IEEE Transactions on Power Electronics 29.6 (2013): 2979-2990.

Hou, Jia, et al. "Analysis and control of series/series-parallel compensated resonant converter for contactless power transfer." IEEE Journal of Emerging and selected topics in Power Electronics 3.1 (2014): 124-136.

Hou, Jia, et al. "Precise characteristics analysis of series/series-parallel compensated contactless resonant converter." IEEE Journal of Emerging and Selected Topics in Power Electronics 3.1 (2014): 101-110.

Lu, Jiang-Hua, et al. "Variable compensation network for achieving constant current or voltage output in IPT system." 2016 International Conference on Industrial Informatics—Computing Technology, Intelligent Technology, Industrial Information Integration (ICIICII). IEEE, 2016.

Zhang, Wei; et al. "Compensation topologies of high-power wireless power transfer systems." IEEE Transactions on Vehicular Technology 65.6 (2015): 4768-4778.

Steigerwald, Robert L. "A comparison of half-bridge resonant converter topologies." IEEE transactions on Power Electronics 3.2 (1988): 174-182.

* cited by examiner

SERIES/SERIES RESONANT TOPOLOGY FOR WIRELESS POWER TRANSFER

STATEMENT OF GOVERNMENTAL INTEREST

The present invention was made under Office of Naval Research, grant number N00014-16-1-2956 and under Department of Energy (DOE) ARPA-E, grant number 1727-1519. The government has certain rights in this invention.

BACKGROUND

Wireless power transfer (WPT) is a popular solution for many power supply areas because no physical connection between the transmitter side and the receiver side of the WPT system is needed. This characteristic makes WPT an attractive method in various battery charging applications, such as electric vehicles, cell phone chargers, medium voltage converter auxiliary power supplies, etc., because no cables are needed during charging. However, a compensation network must be utilized to reduce system reactive power in order to increase efficiency because of the low coupling coefficient between the primary and the secondary sides of the transformer. Common compensation networks include series/series (S/S), series/parallel (S/P), parallel/series (P/S) and parallel/parallel (P/P) compensation networks, which are classified according to the connection of capacitors on the primary and secondary sides, respectively. FIGS. 1A-1C are schematic diagrams of S/S, S/P and S/SP compensation networks, respectively.

For the primary side of the transformer, if a parallel compensation network is used, the compensation capacitance will be a function of the load, require an additional inductor for the primary side, and increase voltage stress for primary side active switches. For a S/S compensation network, there exists two constant voltage (CV) operating frequencies, $\omega_L$ and $\omega_H$, and one constant current (CC) operating frequency. From the duality of the compensation network, the S/P compensation network has two CC operating frequencies and one CV operating frequency $\omega_P$. Under the constant voltage operating frequencies, the output voltage to input voltage gain of S/S and S/P compensation networks are given as, $$G_v(\omega_H) = G_v(\omega_L) = \sqrt{L_2/L_1} \tag{1}$$

$$G_v(\omega_P) = 1/k \cdot \sqrt{L_2/L_1} \tag{2},$$

where $L_1$ and $L_2$ are equivalent self-inductance of the primary and secondary sides, respectively. For many applications, a unity gain or low step-up/step-down ratio of the system is preferred. For S/S topology, a symmetrical coil design can meet this requirement. However, for S/P topology, since the two sides are loosely coupled, the coupling coefficient k is usually less than 0.25, which means that $L_1$ should be at least 1/16 of $L_2$, leading to the transformer having a very asymmetrical coil structure. This asymmetry means that a different turn number, radius and/or wire thickness is needed for the coil structure, which increases the complexity of the coil optimization. In addition, the asymmetrical geometry also creates a problem for high voltage designs since the E-field will not be averagely distributed.

For an S/S compensation network, when operating at the CV resonance frequency, the input impedance will be inductive due to mutual inductance of the coils. In order to reduce the reactive power circulating in the system and thus increase the system frequency, one type of S/SP topology has been designed to make the input impedance resistive. With S/SP compensation, the output filter is required to be an LC filter instead of a pure capacitive filter because two capacitors cannot be directly paralleled before and after the diode full-bridge rectifier.

A need exists for a WPT compensation network that increases efficiency by reducing reactive power and that has a symmetrical coil geometry that can be implemented with relatively low complexity.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure discloses a WPT compensation network that increases efficiency by reducing reactive power and that can have a symmetrical coil geometry that can be implemented with relatively low complexity.

Figure 1A:
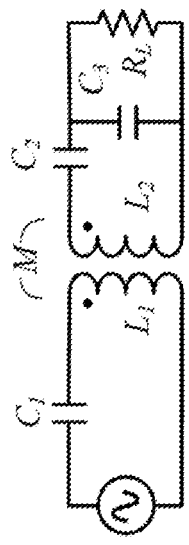
FIGS. 1A-1C illustrate schematic diagrams of known S/S, S/P and S/SP compensation networks, respectively.
Figure 1B:
Figure 1C:
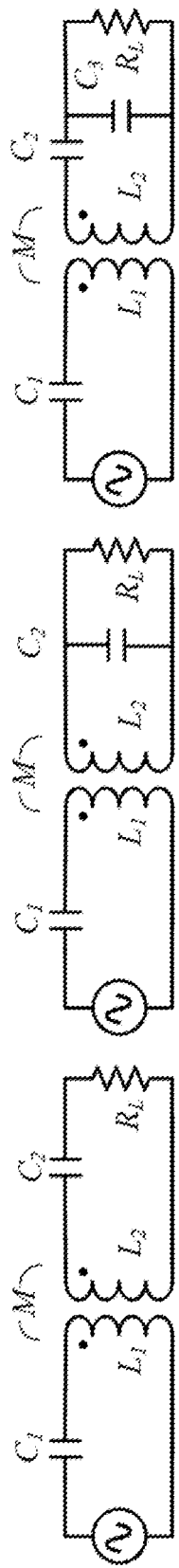
Figure 2:
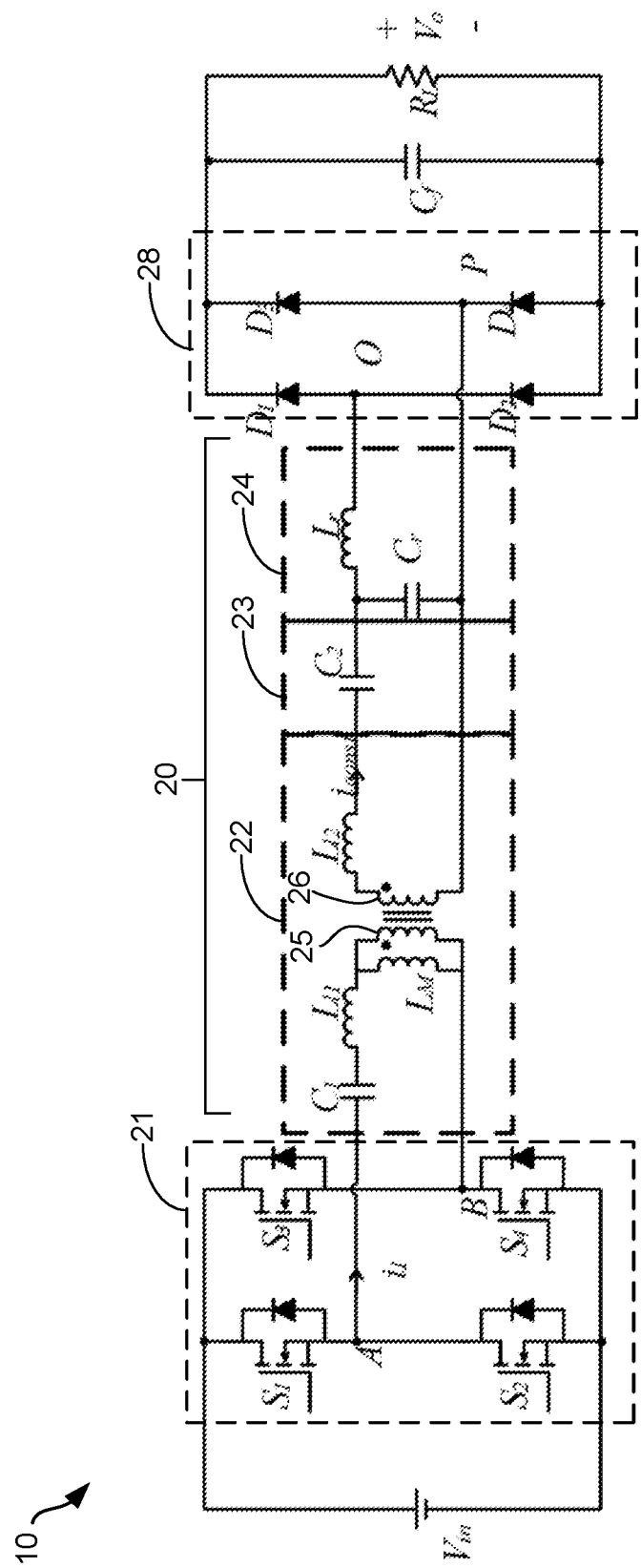
FIG. 2 illustrates a schematic diagram of an S/S-CL topology for use in a WPT compensation network in accordance with a representative embodiment in which the compensation network is employed in a DC-DC converter.

FIG. 2 illustrates a schematic diagram of an S/S-CL resonant topology comprising an S/S-CL compensation network 20 in accordance with a representative embodiment in which the compensation network 20 is employed in a direct current (DC)-DC converter 10 for use in a WPT system. The compensation networks disclosed herein can be used beneficially in other types of converters, such as alternating current (AC)-to-DC (AC-DC) converters, DC-to-AC (DC-AC) converters and AC-AC converters, as will be discussed below with reference to FIGS. 4-6. The inventive principles and concepts disclosed herein are not limited with respect to the types of systems or devices in which the compensation networks disclosed herein can also be employed.

An input DC voltage source $V_{in}$ of the converter 10 is followed by a full-bridge inverter 21 that generates AC excitation for the resonant tank, which, in accordance with this example, includes three parts, namely, a S/S constant current (CC) source 22, a reactive power compensation capacitor $C_2$ 23 and a constant current-to-constant voltage (CC-to-CV) $C_rL_r$ network 24. Thus, the resonant tank is the compensation network 20.

In this example, the S/S CC source 22 comprises a compensation capacitor $C_1$ in series with an inductor $L_{11}$ on the primary side of the transformer and an inductor $L_{12}$ on the secondary side of the transformer. The S/S CC source 22 converts the AC energy outputted from the full-bridge inverter 21 into a constant AC current. The compensation capacitor $C_1$ should be in resonance with self-inductance instead of leakage-inductance under the switching frequency $f_s$ of the full-bridge inverter 21 in order to allow the S/S CC source 22 to operate as a CC source instead of as a CV source.

The constant current generated by the S/S CC source 22 can be expressed as:

$$\hat{i}_{const} = \frac{4}{\pi} \frac{V_{in}}{\omega_s L_M}, \qquad (3)$$

when $$f_s = \frac{1}{2\pi\sqrt{(L_M + L_{l1})C_1}} \qquad (4)$$

where $\hat{i}_{const}$ is the constant current amplitude of the secondary side coil 26, $\omega_s$ is the switching angular frequency of the full-bridge inverter 21, and $L_M$ is the mutual inductance between the primary and secondary side coils 25 and 26, respectively.

The compensation capacitance $C_2$ should be optimized to minimize reactive power in the system while ensuring that the amount of inductive current at nodes A and B is sufficient for the MOSFETs of the switches $S_1$-$S_4$ to perform zero voltage switching (ZVS). If the value of $C_2$ is too small, reactive power increases conduction loss for the switches $S_1$ and the coil 25. If the value of $C_2$ is too large, insufficient inductive current is present to achieve ZVS of the full-bridge inverter 21. In the latter case, hard switching occurs, causing higher spikes of $v_{gs}$ and $v_{ds}$ of the MOSFETs of switches $S_1$-$S_4$, which can be dangerous in terms of overvoltage and shoot through problems. Therefore, a value for $C_2$ that can compensate most of the inductive current and leave some current for ZVS is the best case.

The CL network 24 comprises regulation inductor $L_r$ and regulation capacitor $C_r$. The CL network 24 changes the constant current generated by the CC source 22 into a constant AC voltage:

$$\hat{v}_{OP} = \hat{i}_{const} \cdot \omega_s L_r = \hat{i}_{const} \cdot \frac{1}{\omega_s C_r} \qquad (5)$$

when $$f_s = \frac{1}{2\pi\sqrt{L_r C_r}} \qquad (6)$$

Therefore, when all of the LC parameters are under resonance, the output voltage, $V_o$, can be expressed as:

$$V_o \propto V_{in} \frac{L_r}{L_M} \qquad (7)$$

This equation shows that the output voltage of the S/S-CL topology can be tuned by the ratio between the regulation inductor $L_r$ and the equivalent mutual inductance $L_M$. A diode-bridge rectifier 28 converts the constant AC voltage output from the CL network 24 into a DC voltage signal, which is filtered by capacitor $C_f$.

Since the value the compensation capacitor $C_1$ is calculated based on the value of inductor $L_1$, which is not a function of k, the resonance can always be met no matter what the coupling conditions (e.g., distance, misalignment, etc.) are between the primary and secondary side coils 25 and 26, respectively. Therefore, the gain of the converter 10 can be coarsely tuned by $C_rL_r$ and finely tuned by the distance between two coils 25 and 26. After $C_1$, $C_r$ and $L_r$ are defined, the output voltage $V_o$ of the converter 10 can be easily tuned by the distance between the two coils 25 and 26 while keeping the converter 10 working at a high efficiency operating point by not violating the resonance. This topology also gives more flexibility to coil design by decoupling the coils turn ratio from the converter voltage transfer ratio while keeping low switching and conduction loss. This topolgy provides great flexibility with respect to the turns ratio and with respect to whether the coil design is symmetric or asymmetric.

Figure 3:
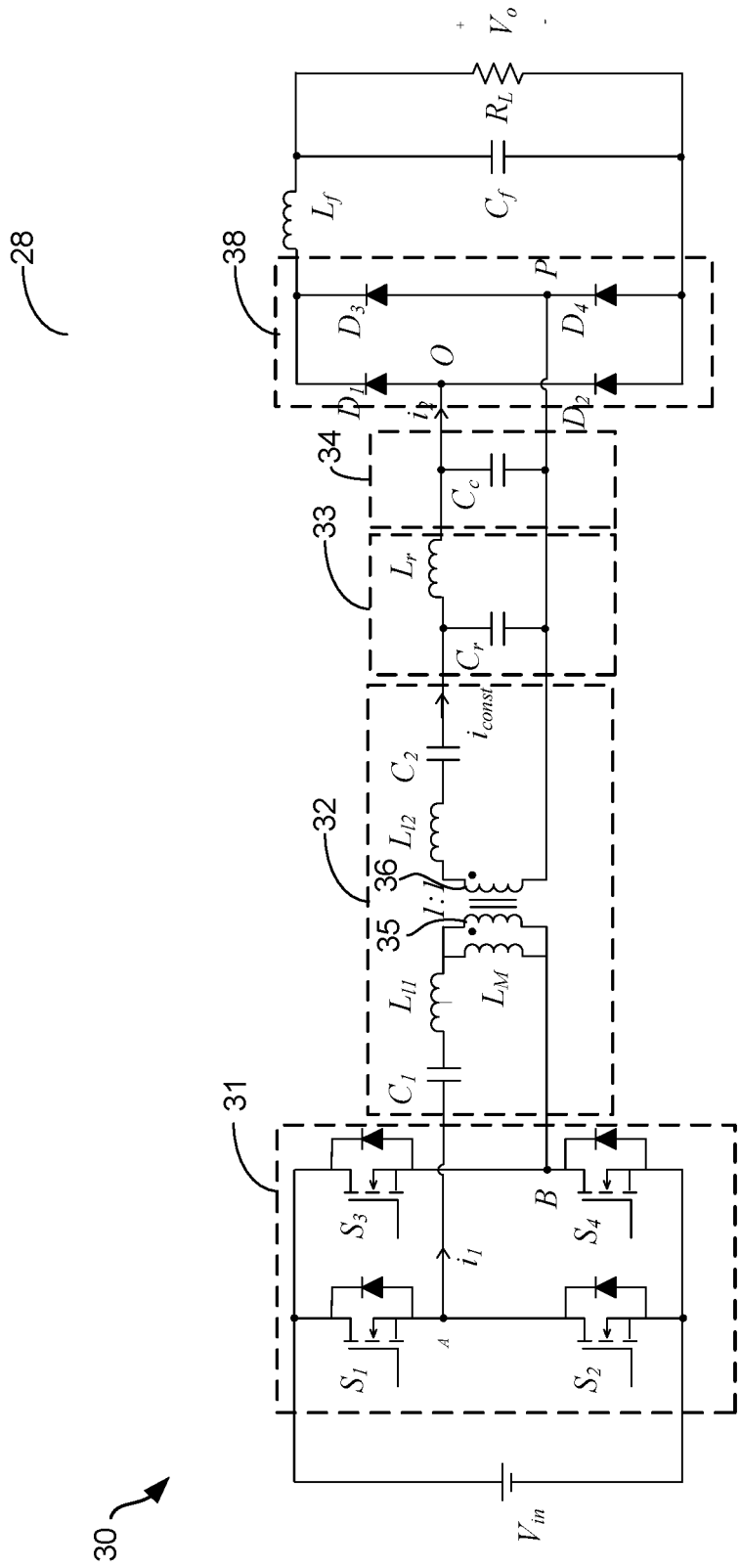
FIG. 3 illustrates a schematic diagram of an S/S-CLC topology for use in a WPT compensation network in accordance with a representative embodiment in which the compensation network is employed in a DC-DC converter.

FIG. 3 illustrates a schematic diagram of an S/S-CLC resonant topology comprising an S/S-CLC compensation network in accordance with a representative embodiment in which the compensation network is employed in a DC-DC converter 30 for use in a WPT system. The compensation network can be used beneficially in other types of converters as well, such as AC-AC, AC-DC, and DC-AC converters, as will be discussed below with reference to FIGS. 4-6. The inventive principles and concepts disclosed herein are not limited with respect to the types of systems or devices in which the compensation networks disclosed herein can also be employed.

An input DC voltage source $V_{in}$ of the converter 30 is followed by a full-bridge inverter 31 that generates AC excitation for the resonant tank, which, in accordance with this example, includes three parts, namely, a S/S constant current (CC) source 32, a constant current-to-constant voltage (CC-to-CV) $C_rL_r$ network 33 and a reactive power compensation capacitor $C_c$ 34. The compensation network of this example comprises the S/S CC source 32, the CC-to-CV network 33 and the compensation capacitor 34.

In this example, the S/S CC source 32 comprises a compensation capacitor $C_1$ in series with an inductor $L_{11}$ on the primary side of the transformer and an inductor $L_{12}$ in series with a capacitor $C_2$ on the secondary side of the transformer. The S/S CC source 32 converts the AC energy outputted from the full-bridge inverter 31 into a constant AC current. Compensation capacitor $C_1$ and $C_2$ should be in resonance with self-inductance instead of leakage-inductance under the switching frequency of the full-bridge inverter 31 in order to allow the S/S CC source 32 operate as a CC source instead of a CV source.

The constant AC current generated by the S/S CC source 32 can be expressed by equation (3), repeated here as equation (8):

$$\hat{i}_{const} = \frac{4}{\pi} \frac{V_{in}}{\omega_s L_M}, \qquad (8)$$

-continued $$\text{when } f_s = \frac{1}{2\pi\sqrt{(L_M + L_{l1})C_1}} = \frac{1}{2\pi\sqrt{(L_M + L_{l2})C_2}} \quad (9)$$

After that, the CL network 33 converts the constant AC current signal into a constant AC voltage signal:

$$\hat{v}_{OP} = \hat{i}_{const} \cdot \omega_s L_r = \hat{i}_{const} \cdot \frac{1}{\omega_s C_r} \quad (10)$$

$$\text{when } f_s = \frac{1}{2\pi\sqrt{L_r C_r}} \quad (11)$$

A diode-bridge rectifier 38 converts the constant AC voltage output from the CL network 33 and compensated by compensation capacitor $C_c$ 34 into a DC voltage signal, which is filtered by an LC filter comprising inductor $L_f$ and capacitor $C_f$. For the LC filter comprising inductor $L_f$ and capacitor $C_f$, $$V_o = 2/\pi \cdot \hat{v}_{op} \quad (12)$$

Therefore, when all of the LC parameters are under resonance, the output voltage can be expressed as:

$$V_o \propto V_{in} \frac{L_r}{L_M} \quad (13)$$

This equation shows that the output voltage of this topology can be tuned by the ratio between the regulation inductor $L_r$ and the equivalent magnetic inductor $L_M$. For the compensation capacitance, $C_c$ 34 should be under resonance with $L_M$ so that the inductive reactive power can be eliminated. If combination of the $C_r L_r$ network 33 and S/S resonant tank 32 is equivalent to a 1-to-n transformer, then, $$C_c = \frac{1}{n^2 \cdot 4\pi^2 f_s^2 L_M} = \frac{1}{(\pi^2/8)^2 \cdot 4\pi^2 f_s^2 L_M} \quad (14)$$

If the value of $C_c$ is too small, reactive power increases conduction loss for the switches $S_1$-$S_4$ and the coils 35 and 36. If the value of $C_c$ is too large, no inductive current is available to help achieve ZVS of the full bridge inverter 31. In this case, hard switching occurs, which causes higher spikes of $v_{gs}$ and $v_{ds}$ of the MOSFETs of the switches $S_1$-$S_4$, which can be dangerous in terms of overvoltage and shoot through problems. Therefore, a value for $C_c$ that can compensate most of the inductive current and leave some current for ZVS is preferred. Since the values of $C_1$ and $C_2$ are calculated based on the values of $L_1$ and $L_2$, which are not a function of k, the resonance can always be met no matter what the coupling conditions are (e.g., distance, misalignment, etc.) between the primary and secondary side coils 35 and 36, respectively.

Therefore, the gain of the converter 30 can be coarsely tuned by choosing $C_r L_r$ and finely tuned by adjusting the distance between the two coils. After the values of $C_1$, $C_r$ and $L_r$ are defined, the output voltage $V_o$ of the converter 30 can be easily tuned by adjusting the distance between the two coils and keeping the converter 30 working at a high efficiency operating point by not violating resonance. The topology gives more flexibility to the coil design by decoupling the turn ratio of the coils 35, 36 from the voltage transfer ratio of the converter 30 while keeping switching and conduction losses low.

Figure 4:
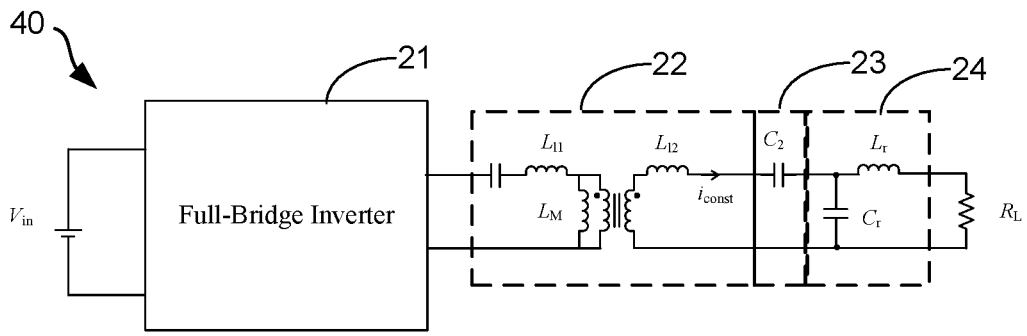
FIG. 4 illustrates a schematic diagram of an S/S-CL topology for use in a WPT compensation network in accordance with a representative embodiment in which the compensation network is employed in a DC-AC converter.
Figure 5:
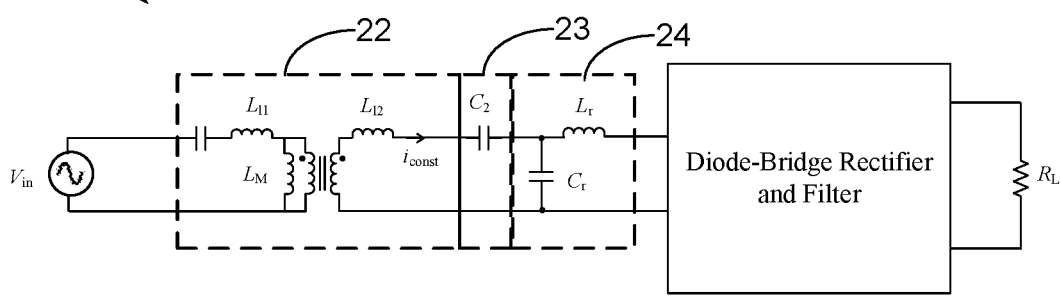
FIG. 5 illustrates a schematic diagram of an S/S-CL topology for use in a WPT compensation network in accordance with a representative embodiment in which the compensation network is employed in a AC-DC converter.
Figure 6:
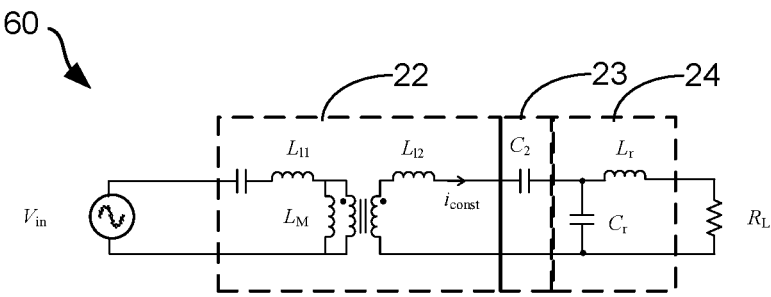
FIG. 6 illustrates a schematic diagram of an S/S-CL topology for use in a WPT compensation network in accordance with a representative embodiment in which the compensation network is employed in a AC-AC converter.

As indicated above, the compensation networks disclosed herein can be employed in other types of converters. FIG. 4 illustrates a schematic diagram of an S/S-CL topology for use in a WPT compensation network in accordance with a representative embodiment in which the compensation network is employed in a DC-AC converter. FIG. 5 illustrates a schematic diagram of an S/S-CL topology for use in a WPT compensation network in accordance with a representative embodiment in which the compensation network is employed in a AC-DC converter. FIG. 6 illustrates a schematic diagram of an S/S-CL topology for use in a WPT compensation network in accordance with a representative embodiment in which the compensation network is employed in a AC-AC converter.

The DC-AC converter 40 shown in FIG. 4 is identical to the DC-DC converter 10 shown in FIG. 2 except that the DC-AC converter 40 does not include the diode-bridge rectifier 28 shown in FIG. 2. The AC-DC converter 50 shown in FIG. 5 is similar to the DC-Dc converter 10 shown in FIG. 2 except that the AC-DC converter 50 has an AC voltage source for generating an AC input voltage signal, $V_{in}$ and does not include the full-bridge inverter 21. The AC-AC converter 60 shown in FIG. 6 is identical to the AC-DC converter 50 shown in FIG. 5, except the AC-AC converter 60 does not include the diode-bridge rectifier 28 and capacitance filter shown in FIG. 2.

Although the converters 40-60 shown in FIGS. 4-6, respectively, employ the S/S-CL resonant topology shown in FIG. 2, the converters 40-60 could instead employ the S/S-CLC resonant topology shown in FIG. 3, or some other resonant S/S topology in accordance with the inventive principles and concepts disclosed herein.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A wireless power transfer (WPT) system comprising:
   a compensation network for reducing reactive power in the WPT system, the compensation network comprising:
      a series/series (S/S) constant current (CC) source comprising a transformer and a S/S compensation network for the transformer, the S/S compensation network consisting of a first compensation capacitor and a second compensation capacitor, the first compensation capacitor being connected in series with a first inductor on a primary side of the transformer and the second compensation capacitor being connected in series with a second inductor on a second-ary side of the transformer, the first compensation capacitor, the first inductor and a mutual inductance of the transformer configured for resonant operation at a defined frequency, the S/S CC source converting an input voltage signal of the WPT system into a constant alternating current (AC) current signal at the defined frequency; and
      a constant current (CC)-to-constant voltage (CV) network comprising at least a third capacitor and a third inductor, the CC-to-CV network configured for resonant operation at the defined frequency, the CC-to-CV network converting the constant AC current signal into a constant AC voltage signal at the defined frequency.

2. The WPT system of claim 1, further comprising:
a full-bridge inverter, wherein the defined frequency is a switching frequency of the full-bridge inverter, and:
the second compensation capacitor is electrically coupled between the second inductor and the third inductor; and
a value of the second compensation capacitor is selected for resonance with a self-inductance of the transformer under the switching frequency of the full-bridge inverter to allow the S/S CC source to operate as a CC source.

3. The WPT system of claim 2, further comprising:
a full-bridge inverter, wherein:
the second compensation capacitor is electrically coupled to the third capacitor; and
a value of the second compensation capacitor is selected to provide inductive current in the full-bridge inverter for zero voltage switching (ZVS) of switches in the full-bridge inverter.

4. The WPT system of claim 1, wherein the WPT system is a direct current (DC)-to-DC converter comprising a full-bridge inverter that converts the input voltage signal into AC energy.

5. The WPT system of claim 4, wherein the DC-to-DC converter further comprises a diode-bridge rectifier that converts the constant AC voltage signal into a DC voltage signal.

6. The WPT system of claim 1, wherein the WPT system is a direct current (DC)-to-AC converter comprising a full-bridge inverter that converts the input voltage signal into AC energy.

7. The WPT system of claim 1, wherein the WPT system is an AC-to-direct current (DC) converter comprising a diode-bridge rectifier that converts the constant AC voltage signal into a DC voltage signal.

8. The WPT system of claim 1, wherein the WPT system is an AC-to-AC converter.

9. The WPT system of claim 1, further comprising:
a reactive power compensation capacitor electrically coupled to the third inductor and to an output node of the compensation network.

10. The WPT system of claim 9, wherein the WPT system is a direct current (DC)-to-DC converter comprising a full-bridge inverter that converts the input voltage signal into AC energy.

11. The WPT system of claim 10, wherein:
the DC-to-DC converter further comprises a diode-bridge rectifier that converts the constant AC voltage signal into a DC voltage signal; and
the reactive power compensation capacitor is coupled between inputs of the diode-bridge rectifier.

12. The WPT system of claim 9, wherein the WPT system is a direct current (DC)-to-AC converter comprising a full-bridge inverter that converts the input voltage signal into AC energy.

13. The WPT system of claim 9, wherein the WPT system is an AC-to-direct current (DC) converter comprising a diode-bridge rectifier that converts the constant AC voltage signal into a DC voltage signal.

14. The WPT system of claim 9, wherein the WPT system is an AC-to-AC converter.

15. A method for reducing reactive power in a wireless power transfer (WPT) system, the method comprising:
providing a compensation network comprising:
a series/series (S/S) constant current (CC) source comprising a transformer and a S/S compensation network for the transformer, the S/S compensation network consisting of a first compensation capacitor and a second compensation capacitor, the first compensation capacitor being connected in series with a first inductor on a primary side of the transformer and the second compensation capacitor being connected in series with a second inductor on a secondary side of the transformer, the first compensation capacitor, the first inductor and a mutual inductance of the transformer configured for resonant operation at a defined frequency; and
a constant current (CC)-to-constant voltage (CV) network comprising at least a third capacitor and a third inductor, the CC-to-CV network configured for resonant operation at the defined frequency;
with the S/S CC source, converting an input voltage signal of the WPT system into a constant alternating current (AC) current signal at the defined frequency; and
with the CC-to-CV network, converting the constant AC current signal into a constant AC voltage signal at the defined frequency.

16. The method of claim 15, further comprising:
prior to the S/S CC source converting the input voltage signal of the WPT system into the constant AC current signal, with a full-bridge inverter, converting the input voltage signal into AC energy, and wherein the S/S CC source converts the AC energy into the constant AC current signal.

17. The method of claim 16, further comprising:
after the CC-to-CV network converts the constant AC current signal into the constant AC voltage signal, with a diode-bridge rectifier, converting the constant AC voltage signal into a DC voltage signal.

18. The method of claim 17, further comprising:
filtering the DC voltage signal and applying the filtered DC voltage signal to a load of the WPT system.

19. The method of claim 16, further comprising:
after the CC-to-CV network converts the constant AC current signal into the constant AC voltage signal, applying the constant AC voltage signal to a load of the WPT system.

20. The method of claim 15, further comprising:
after the CC-to-CV network converts the constant AC current signal into the constant AC voltage signal, with a diode-bridge rectifier, converting the constant AC voltage signal into a DC voltage signal.

\* \* \* \* \*